(12) United States Patent
Chen et al.

(10) Patent No.: US 10,396,949 B2
(45) Date of Patent: Aug. 27, 2019

(54) METHOD AND EQUIPMENT FOR PROCESSING INTERFERENCE SIGNALS

(71) Applicant: Samsung Electronics Co., Ltd., Gyeonggi-do (KR)

(72) Inventors: Zixiong Chen, Beijing (CN); Xutao Zhou, Beijing (CN); Dajin Wang, Beijing (CN); Jinghui Xie, Beijing (CN); Songhui Shen, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/115,504

(22) PCT Filed: Jan. 29, 2015

(86) PCT No.: PCT/KR2015/000968
§ 371 (c)(1),
(2) Date: Jul. 29, 2016

(87) PCT Pub. No.: WO2015/115828
PCT Pub. Date: Aug. 6, 2015

(65) Prior Publication Data
US 2017/0012750 A1    Jan. 12, 2017

(30) Foreign Application Priority Data

Jan. 29, 2014 (CN) .......................... 2014 1 0043914

(51) Int. Cl.
*H04W 72/00* (2009.01)
*H04L 5/00* (2006.01)
(Continued)

(52) U.S. Cl.
CPC .......... *H04L 5/0032* (2013.01); *H04B 17/21* (2015.01); *H04B 17/345* (2015.01);
(Continued)

(58) Field of Classification Search
CPC ...... H04W 16/12; H04W 72/04; H04W 24/00
(Continued)

(56) References Cited

U.S. PATENT DOCUMENTS 6,212,384 B1 * 4/2001 Almgren ............... H04W 16/00
455/446
6,804,212 B1 * 10/2004 Vallstrom ............. H04W 36/16
370/328
(Continued)

FOREIGN PATENT DOCUMENTS

EP    2 413 514    2/2012
EP    2 661 002    11/2013
(Continued)

OTHER PUBLICATIONS

Orange, NAICS How to coordinate link adaptation for CWIC receivers, R4-134102, 3GPP TSG-RAN WG4 #68, Barcelona, Spain, Aug. 19-23, 2013.
(Continued)

*Primary Examiner* — Lester G Kincaid
*Assistant Examiner* — Matthew W Genack
(74) *Attorney, Agent, or Firm* — The Farrel Law Firm, P.C.

(57) ABSTRACT

A method for processing interference signals, comprising the following steps of: receiving, by a terminal, configuration information sent by a base station to obtain periodic scheduling configuration information of a neighbor cell on specific time-frequency resources; detecting, by the terminal, an interference signal of the neighbor cell according to the scheduling configuration information, and acquiring information about the interference signal; and, performing, by the terminal, interference cancellation and/or interference suppression on the detected interference signal according to the information about the interference signal.

3 Claims, 5 Drawing Sheets

(51) Int. Cl.
  *H04B 17/21* (2015.01)
  *H04B 17/345* (2015.01)
  *H04W 72/04* (2009.01)
  *H04W 72/12* (2009.01)
  *H04L 1/00* (2006.01)

(52) U.S. Cl.
  CPC ..... *H04W 72/042* (2013.01); *H04W 72/1231* (2013.01); *H04L 1/0003* (2013.01); *H04L 5/0073* (2013.01)

(58) Field of Classification Search
  USPC .............................. 455/447, 450–451, 452.1
  See application file for complete search history.

(56) References Cited

U.S. PATENT DOCUMENTS

| | | | | |
|---|---|---|---|---|
| 2008/0108358 | A1* | 5/2008 | Patel | H04W 48/20 455/446 |
| 2008/0108363 | A1 | 5/2008 | Yu et al. | |
| 2008/0117998 | A1* | 5/2008 | Kato | H04L 1/0028 375/267 |
| 2011/0211589 | A1* | 9/2011 | Fang | H04L 5/003 370/431 |
| 2011/0235598 | A1* | 9/2011 | Hilborn | H04W 52/143 370/329 |
| 2012/0122440 | A1 | 5/2012 | Krishnamurthy et al. | |
| 2012/0231790 | A1* | 9/2012 | Lindoff | H04W 48/16 455/434 |
| 2013/0107867 | A1* | 5/2013 | Li | H04B 1/005 370/336 |
| 2013/0244678 | A1 | 9/2013 | Damnjanovic et al. | |
| 2013/0244709 | A1* | 9/2013 | Davydov | H04W 28/0268 455/501 |
| 2013/0288694 | A1* | 10/2013 | Mochizuki | H04W 72/04 455/450 |
| 2014/0071848 | A1 | 3/2014 | Park et al. | |
| 2014/0161059 | A1* | 6/2014 | Lee | H04B 7/0452 370/329 |
| 2015/0016331 | A1 | 1/2015 | Kim et al. | |
| 2015/0131524 | A1* | 5/2015 | Cavalcante | H04W 72/0426 370/328 |
| 2015/0304063 | A1* | 10/2015 | Zhu | H04W 72/12 370/329 |
| 2016/0197690 | A1* | 7/2016 | Li | H04L 25/0224 370/278 |

FOREIGN PATENT DOCUMENTS

| | | |
|---|---|---|
| WO | WO 2012/144842 | 10/2012 |
| WO | WO 2013-108135 | 7/2013 |
| WO | WO 2013-147472 | 10/2013 |
| WO | WO 2013/151404 | 10/2013 |

OTHER PUBLICATIONS

PCT/ISA/237 Written Opinion issued on PCT/KR2015/000968 (pp. 6).
PCT/ISA/210 Search Report issued on PCT/KR2015/000971 (pp. 3).
European Search Report dated Aug. 4, 2017 issued in counterpart application No. 15743129.7-1875, 5 pages.
Japanese Office Action dated Nov. 5, 2018 issued in counterpart application No. 2016-549034, 6 pages.

* cited by examiner

METHOD AND EQUIPMENT FOR PROCESSING INTERFERENCE SIGNALS

PRIORITY

This application is a National Phase Entry of PCT International Application No. PCT/KR2015/000968, which was filed on Jan. 29, 2015, and claims priority to Application No. 201410043914.6, which was filed in the State Intellectual Property Office of China on Jan. 29, 2014, the contents of each of which are incorporated herein by reference.

TECHNICAL FIELD

The invention relates to the technical field of radio communications, and particularly to a method and equipment for processing interference signals.

BACKGROUND ART

With the continuous development of the mobile communication technology, the total data transmission rate from system perspective is increasing sharply. However, due to the larger interference of neighbor cells, the performance of cell edge user equipment (UE) is difficult to be improved greatly. This is also becomes a bottleneck of the increase of the data transmission rate. Many researches, being discussed by the 3GPP organization currently, in the LTE technology are related to the improvement of the performance of the edge UE, for example, coordinated multipoint transmission (CoMP), enhanced inter-cell interference cancellation (eICIC, like almost blank subframe, ABS), receiver based on network-assisted interference cancellation and/or suppression (NAICS), etc. The NAICS receiver is mainly implemented on UE side, and the UE detects the signals sent by one or more heavily interfering cells to achieve the purpose of canceling these interference signals and thus improving the cell edge UE's performance.

NAICS receivers, being discussed and researched by the 3GPP organization currently, have a plurality of directions. However, considering the tradeoff between performance gain and the implementation complexity of receivers, manufacturers are more inclined to the interference symbol level detection. For example, symbol level maximum likelihood (SLML) receiver and symbol level interference cancellation (SLIC) receiver, the performance gain of which has been confirmed by all the manufacturers in the working group RAN4, have become NAICS receiver solutions having the highest development potential in Release 12.

In such NAICS receiver solutions, interference signals of neighboring cells may be detected only after UE acquires the related information about the neighboring cells. Such information is mainly classified into two types: one type is static scheduling information, i.e., parameter which will not change within a certain time period, for example, control format indicator (CFI), multimedia broadcast multicast service single frequency network (MBSFN) configuration, cell-specific reference signal (CRS) configuration, channel state information reference signal (CSI-RS) configuration, system bandwidth, cell identity (ID), cell-specific parameter P_B associated with the downlink transmission power allocation, etc.; while the other type is dynamic scheduling information, i.e., parameters which are likely to vary in each subframe, for example, modulation and coding scheme (MCS), transmission mode (TM), rank indicator (RI), precoding matrix indicator (PMI), UE-specific parameter P_A associated with the downlink transmission power allocation, and the allocation information of physical downlink shared channel (PDSCH), etc.

The dynamic scheduling information mentioned above has been described in LTE standards as below.

a) 10 transmission modes have been listed in the LTE standard Release 11. Transmission mode 1: transmission through a single antenna port of eNodeB; transmission mode 2: transmission diversity; transmission mode 3: open-loop spatial multiplexing; transmission mode 4: closed-loop spatial multiplexing; transmission mode 5: multi-user multiple input multiple output (MU-MIMO); transmission mode 6: closed-loop spatial multiplexing with rank 1; transmission mode 7: transmission using UE-specific reference signals (a single antenna port); transmission mode 8: transmission using UE-specific reference signals (up to two antenna ports); transmission mode 9: transmission using UE-specific reference signals (up to eight antenna ports); and, transmission mode 10: transmission using UE-specific reference signals (for CoMP transmission).

b) There are 32 types of MCSs defined in the standards: MCS0, MCS1, . . . , MCS31, where MCS0-MCS9 refer to QPSK transmission, MCS10-MCS16 refer to 16 QAM transmission, MCS17-MCS28 refer to 16 QAM transmission, and MCS29-MCS31 are used for retransmission.

c) For RI and PMI, up to 8 layers transmission is supported in the current standards. Particularly, for two antenna ports transmission, PMI={0, 1, 2, 3} for RI=1; and PMI={ 1, 2} for RI=2. For four antenna ports transmission, RI could be { 1, 2, 3, 4}, and there are 16 types of optional PMIs, PMI={0, 1, 2, . . . , 15}.

d) For parameter P_A, there are 8 optional values {−6 dB, −4.77 dB, −3 dB, −1.77 dB, 0 dB, 1 dB, 2 dB, 3 dB} defined in the standards.

In NAICS standardization progress, 3GPP working groups RAN1 and RAN4 are mainly inclined to two solutions on how UE acquires the dynamic scheduling information:

a) One solution is using dynamic signaling indicators. This solution has the advantage of low UE implementation complexity and the apparent disadvantages that the signaling overhead is very large and base stations need to exchange a large amount of real-time information;

b) The other solution is performing blind detection to obtain these dynamic parameters totally by the UE itself. This solution doesn't introduce any additional signaling overhead, but requires high UE implementation complexity with a lot of blind detection parameters combinations.

This solution, where these dynamic parameters are blindly detected without additional signaling overhead, has the disadvantages that the UE implementation complexity is extremely high and there are a large number of parameter combinations to be blindly detected (the parameters combinations amount is at least the exponential of the total number of modulation constellation, where the exponential is the number of RI and PMI combinations).

In addition, when these dynamic parameters are configured with some values, for example, when the interference is a multi-layer transmission with high-order modulation scheme like 64 QAM, the NAICS receiver cannot achieve good interference signal blind detection performance and interference cancellation/suppression performance.

Therefore, it is very necessary to provide effective technical solutions to solve the problem that NAICS receiver cannot achieve good interference signal blind detection performance and interference cancellation/suppression performance.

DISCLOSURE OF INVENTION

Technical Problem

An objective of the present invention is to solve at least one of the above technical deficiencies. Particularly, UE acquires scheduling configuration information of an interference signal of a neighbor cell on specific time-frequency resources by reading configuration information of a serving base station, thereby improving the interference signal blind detection performance and interference cancellation/suppression performance of a NAICS receiver.

On this account, a main objective of the present application is to improve the correctness of UE in detecting information about the interference signal of a neighbor base station, so that the interference signal is cancelled and/or suppressed, the detection accuracy of channel information and the demodulation correctness of useful signals are improved, and the data transmission throughput of cell edge UE is thus increased.

Solution to Problem

To achieve the above objective, one aspect of the present invention provides a method for processing interference signals, comprising the following steps of: receiving, by a terminal, configuration information sent by a base station to obtain periodic scheduling configuration information of a neighbor cell on specific time-frequency resources; detecting, by the terminal, an interference signal of the neighbor cell according to the scheduling configuration information, and acquiring information about the interference signal; and performing, by the terminal, interference cancellation and/or interference suppression on the detected interference signal according to the information about the interference signal.

Another aspect of the present invention further provides a network-assisted method for processing interference signals, comprising the following steps of: configuring for a cell, by a base station, periodic scheduling configuration information on first specific time-frequency resources, sending the periodic scheduling configuration information on the first specific time-frequency resources to a neighbor base station, and receiving periodic scheduling configuration information on second specific time-frequency resources sent by the neighbor base station; sending, by the base station, the periodic scheduling configuration information of the neighbor cell on the second specific time-frequency resources to a terminal; and sending, by the base station, on the first specific time-frequency resources, data to the terminal according to the scheduling configuration information.

Another aspect of the present invention further provides terminal equipment, comprising a receiving module, a detection module and a processing module, the receiving module is configured to receive configuration information sent by a base station to obtain periodic scheduling configuration information of a neighbor cell on specific time-frequency resources; the detection module is configured to detect an interference signal of the neighbor cell according to the scheduling configuration information and acquire information about the interference signal; and the processing module is configured to perform interference cancellation and/or interference suppression on the detected interference by using the information about the interference signal.

Another aspect of the present invention further provides base station equipment, comprising a resource configuration module, a receiving module and a sending module, the resource configuration module is configured to configure periodic scheduling configuration information on first specific time-frequency resources for a cell; the receiving module is configured to receive periodic scheduling configuration information on second specific time-frequency resources sent by the neighbor base station; and the sending module is configured to send the periodic scheduling configuration information of the neighbor cell on the second specific time-frequency resources to a terminal, and send, on the first specific time-frequency resources, data to the terminal according to the scheduling configuration information.

Advantageous Effects of Invention

By the above solutions provided by the present invention, by reading configuration information of a serving base station, a terminal acquires scheduling configuration information of the interference signal of a neighbor cell on specific time-frequency resources; by the obtained scheduling configuration information of the neighbor cell, the terminal detects and identifies information about the interference signal of the neighbor cell, so as to effectively perform cancellation and/or suppression on the interference signal. By the above solutions provided by the present invention, the correctness of UE in detecting information about the interference signal of a neighbor base station can be improved, so that the interference signal is cancelled and/or suppressed, the detection accuracy of channel information and the demodulation correctness of useful signals are improved, and the data transmission throughput of cell edge UE is thus increased. Moreover, by the above solutions provided by the present invention, few changes are required to be done to an existing system, so that the compatibility of the system will not be influenced and the implementation is simple and efficient.

Additional aspects and advantages of the present invention will be given in the following descriptions. These aspects and advantages will become apparent from the following descriptions or be appreciated from the practices of the present invention.

BRIEF DESCRIPTION OF DRAWINGS

The above and/or additional aspects and advantages of the present invention tend to be obvious and comprehensible by the following description of embodiments in combination with figures, wherein.

MODE FOR THE INVENTION

Embodiments of the present invention will be described in details as below. The examples of the embodiments are illustrated in the accompanying drawings, wherein similar or same reference numbers indicate similar or same elements or elements with same or similar functions throughout the drawings. The embodiments described with reference to the drawings are intended to explain the present invention and shall not be construed as limitations to the present invention.

To realize the objective of the present invention, an embodiment of the present invention provides a method for processing interference signals, including the following steps of: receiving, by a terminal, configuration information sent by a base station to obtain periodic scheduling configuration information of a neighbor cell on specific time-frequency resources; detecting, by the terminal, an interference signal of the neighbor cell according to the scheduling configuration information, and acquiring information about the interference signal; and performing, by the terminal, interference cancellation and/or interference suppression on the detected interference signal according to the information about the interference signal.

By the above solutions provided by the present invention, by reading configuration information of a serving base station, a terminal acquires scheduling configuration information of the interference signal of a neighbor cell on specific time-frequency resources; and by the obtained scheduling configuration information of the neighbor cell, the terminal detects and identifies information about the interference signal of the neighbor cell, so as to effectively perform cancellation and/or suppression on the interference signal.

Figure 1:
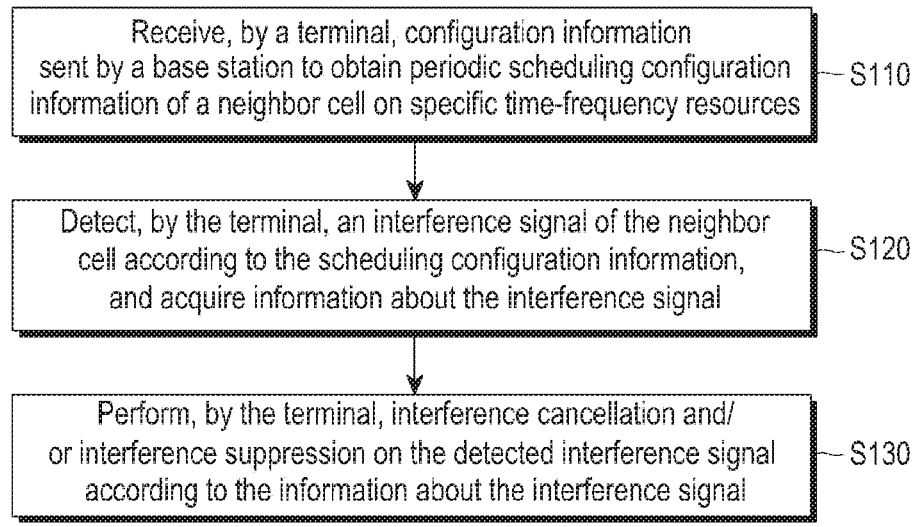
FIG. 1 is a flowchart of a method for processing interference signals on the terminal side according to an embodiment of the present invention.

As shown in FIG. 1, a flowchart of a method for processing interference signals on the terminal side according to an embodiment of the present invention is shown, including the following steps:

S110: A terminal receives configuration information sent by a base station to acquire periodic scheduling configuration information of a neighbor cell on specific time-frequency resources.

In S110, the terminal reads, by broadcast signaling or a radio resource configuration (RRC) message, configuration information configured by a serving base station for the terminal.

In S110, the neighbor cell refers to one or more neighbor cells whose interference signal will be detected by UE. The specific time-frequency resources refer to especially reserved subframes (SF) and resource blocks (RB). On the specific time-frequency resources, the UE just needs to detect an interference signal of the neighbor cell within the given scheduling configuration information of the neighbor cell.

As an embodiment of the present invention, a configuration method of the specific time-frequency resources is: configuring same time domain resources for each base station.

Figure 2:
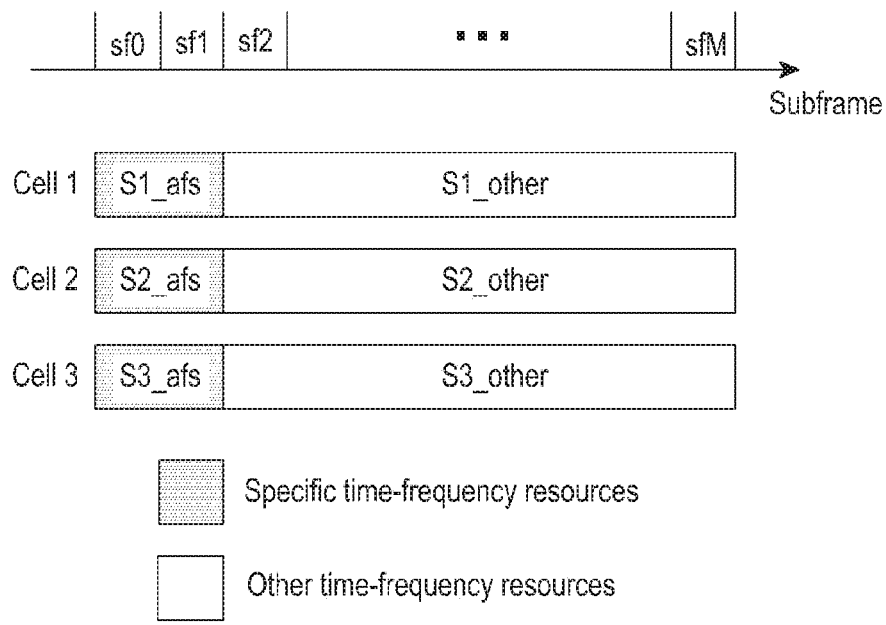
FIG. 2 is a schematic diagram of division of same specific time-frequency resources (subframes) used by base stations in a method for processing interference signals according to another embodiment of the present invention.

As shown in FIG. 2, a schematic diagram of division of same specific time-frequency resources (subframes) used by base stations in a method for processing interference signals according to another embodiment of the present invention is shown. The following description is given with reference to FIG. 2.

Taking three cells as example, the three cells are configured with respective subframe sets S1_afs, S2_afs and S3_afs, and use the subframe sets S1_afs, S2_afs and S3_afs as their specific subframe resources. Here, the S1_afs, S2_afs and S3_afs are completely the same.

As an embodiment of the present invention, another configuration method of the specific time-frequency resources is: configuring different time domain resources for each base station.

Figure 3:
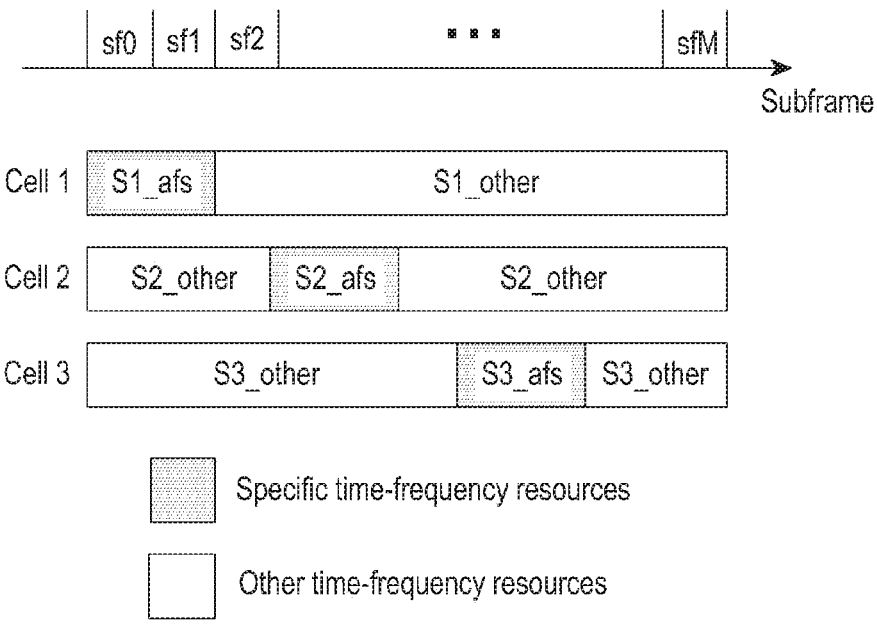
FIG. 3 is a schematic diagram of division of different specific time-frequency resources (subframes) used by the base stations in a method for processing interference signals according to another embodiment of the present invention.

As shown in FIG. 3, a schematic diagram of division of different specific time-frequency resources (subframes) used by the base stations in a method for processing interference signals according to another embodiment of the present invention is shown. The following description is given with reference to FIG. 3.

Taking three cells as example, the three cells are configured with respective subframe sets S1_afs, S2_afs and S3_afs, and use the subframe sets S1_afs, S2_afs and S3_afs as their specific subframe resources. Here, the S1_afs, S2_afs and S3_afs are not completely the same.

As an embodiment of the present invention, another configuration method of the specific time-frequency resources is: configuring same frequency domain resources for each base station.

Figure 4:
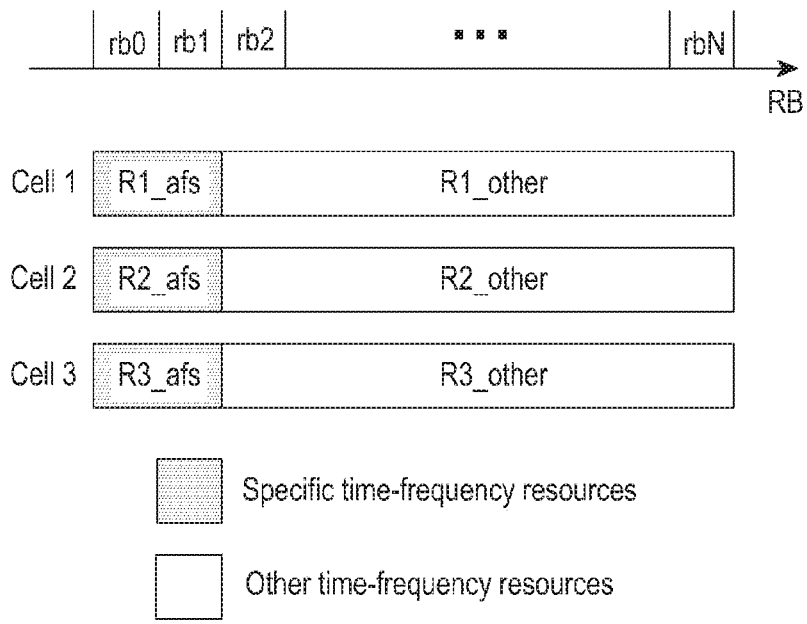
FIG. 4 is a schematic diagram of division of same specific time-frequency resources (RBs) used by the base stations in a method for processing interference signals according to another embodiment of the present invention.

As shown in FIG. 4, a schematic diagram of division of same specific time-frequency resources (RBs) used by the base stations in a method for processing interference signals according to another embodiment of the present invention is shown. The following description is given with reference to FIG. 4.

Taking three cells as example, the three cells are configured with respective RB sets R1_afs, R2_afs and R3_afs, and use the RB sets R1_afs, R2_afs and R3_afs as their specific RB resources. Here, the R1_afs, R2_afs and R3_afs are completely the same.

As an embodiment of the present invention, another configuration method of the specific time-frequency resources is: configuring different frequency domain resources for each base station.

Figure 5:
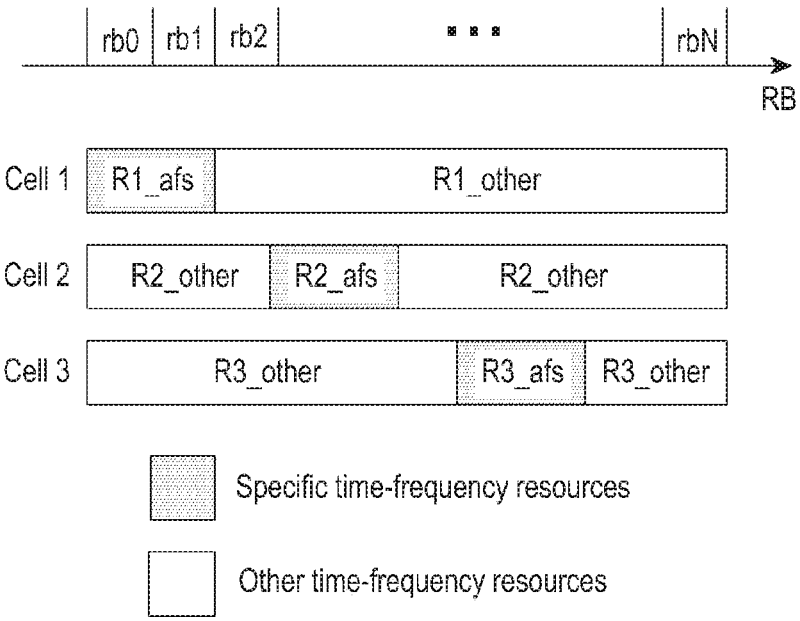
FIG. 5 is a schematic diagram of division of different specific time-frequency resources (RBs) used by the base stations in a method for processing interference signals according to another embodiment of the present invention.

As shown in FIG. 5, a schematic diagram of division of different specific time-frequency resources (RBs) used by the base stations in a method for processing interference signals according to another embodiment of the present invention is shown. The following description is given with reference to FIG. 5.

Taking three cells as example, the three cells are configured with respective RB sets R1_afs, R2_afs and R3_afs, and use the RB sets R1_afs, R2_afs and R3_afs as their specific RB resources. Here, the R1_afs, R2_afs and R3_afs are not completely the same.

As an embodiment of the present invention, the periodic scheduling configuration information is periodically repeated constraint scheduling information for constraining one or more of the following configuration information within a preset range: modulation scheme, transmission mode, rank indicator, precoding matrix indicator, UE-specific demodulation reference symbols and downlink transmission power.

Specifically, in this step, the scheduling configuration information refers that a neighbor cell can perform constraint scheduling only on specific time-frequency resources. That is, a scheduler can only use the modulation scheme, transmission mode, rank indicator, precoding matrix indicator, UE-specific demodulation reference symbols and downlink transmission power and the like within a preset range on the specific time-frequency resources.

In this step, the modulation scheme constrained within a preset range by the constraint scheduling refers that a base station needs to perform scheduling on specific time-frequency resources in a lower-level modulation scheme, for example, QPSK and 16 QAM.

In this step, the transmission mode constrained within a preset range by the constraint scheduling refers that a base station needs to perform scheduling on specific time-frequency resources in one or more specific transmission modes already defined in the standards, for example, TM4 and TM3.

In this step, the rank indicator constrained within a preset range by the constraint scheduling refers that a base station needs to perform scheduling on specific time-frequency resources by using a lower rank, for example RI=1.

In this step, the precoding matrix indicator constrained within a preset range by the constraint scheduling refers to a limited optional range for pre-coding, for example, PMI={1, 5, 9, 13} in a system having four transmitting antenna ports.

In this step, the special demodulation reference symbols constrained within a preset range by the constraint scheduling refer to a limited optional range for UE-specific modulation reference symbol sequences, for example, n_SCID is 0 or the port number is 7 in TM9.

In this step, the transmission power constrained within a preset range by the constraint scheduling refers that a base station needs to perform scheduling on specific time-frequency resources by using higher transmission power, for example, the parameter PA associated with the downlink transmission power is set as +3 dB.

In S110, further, the terminal may also report its capability of processing interference signals to a base station, so that the base station determines whether to configure corresponding specific time-frequency resource information and specific scheduling configuration information or not for the terminal, or so that the base station selects and configures appropriate specific time-frequency resource information and specific scheduling configuration information for the terminal. For example, the terminal may report whether it supports interference detection in one or more transmission modes or not, for example, TM3 and TM4; for another example, the terminal may report whether it supports interference detection in one or more modulation schemes or not, such as, 64 QAM or 16 QAM; for further example, the terminal may report whether it supports interference detection with RI=2 or not, etc. The base station will select matched periodic scheduling configuration information of a neighbor cell on specific time-frequency resources according to the capability of the terminal for processing interference signals, so that the terminal processes interference signals better.

As an embodiment of the present invention, a configuration method of the constraint scheduling information is: configuring same constraint scheduling information for each base station. The scheduling of each base station in a reserved subframe set meets the following conditions:

in a lower-level modulation scheme, the set of optional modulation methods is {QPSK,16 QAM};

the set of optional transmission modes is {TM4, TM3};

by using a lower rank, the set of optional RI is {RI=1};

by using pre-coding within a preset range, for example, in a system having four transmitting antenna ports, the set of optional PMI is {1, 5, 9, 13}; and by using higher transmission power, the optional range of the parameter PA associated with the downlink transmission power is {2 dB,3 dB}.

As an embodiment of the present invention, another configuration method of the constraint scheduling information is: configuring different constraint scheduling information for each base station. Taking two base stations as example, the scheduling of the first base station in a reserved subframe set meets the following conditions:

in a lower-level modulation scheme, the set of optional modulation methods is {QPSK,16 QAM};

the set of optional transmission modes is {TM4, TM3};

by using a lower rank, the set of optional RI is {RI=1};

by using pre-coding within a preset range, for example, in a system having four transmitting antenna ports, the set of optional PMI is { 1, 5, 9, 13}; and by using higher transmission power, the optional range of the parameter PA associated with the downlink transmission power is {2 dB,3 dB}.

The scheduling of the second base station in a reserved subframe set meets the following conditions:

in a lower-level modulation scheme, the set of optional modulation methods is {QPSK};

the set of optional transmission modes is {TM4};

by using a lower rank, the set of optional RI is {RI=1};

by using pre-coding within a preset range, for example, in a system having four transmitting antenna ports, the set of optional PMI is { 1, 5, 9, 13}; and by using higher transmission power, the optional range of the parameter PA associated with the downlink transmission power is {3 dB}.

As an embodiment of the present invention, the terminal identifies the specific time-frequency resources in any one of the following manners: bitmap, starting subframe offset, or starting resource block number.

Specifically, one indication method of specific time-frequency resources is: indicating the reservation within a time cycle in a manner of bitmap. For example, 40 bits are used, corresponding to the configuration of each subframe within 40 ms cycle. If the corresponding bit is 1, it is indicated that the subframe is specific subframe resource; and if the corresponding bit is 0, it is indicated that the subframe is non-specific subframe resource, i.e., common subframe resource. For example, the bitmap can be referred the method for configuring an ABS subframe in the existing eICIC/FeICIC technology.

Specifically, another indication method of specific time-frequency resources is: indicating the reservation within a time cycle by the starting subframe offset, the number of specific subframes and the cycle length. For example, if the cycle length is 40 ms, the starting subframe offset is 0 and the number of specific subframes is 3, it is indicated that subframes 0, 1 and 2 are specific subframe resources within every 40 ms cycle, and other subframes 3, 4, . . . , 39 are non-specific subframe resources, i.e., common subframe resources.

Specifically, another indication method of specific time-frequency resources is: indicating the reservation of each RB within the system bandwidth in a manner of bitmap. For example, if 10M of system bandwidth employs 50 bits of information, corresponding to configuration of 50 RBs, respectively, and if the corresponding bit is 1, it is indicated that the RB is specific RB resource; and if the corresponding bit is 0, it is indicated that the RB is non-specific RB resource, i.e., common RB resource.

Specifically, yet another indication method of specific time-frequency resources is: indicating the reservation within the system bandwidth by the stating RB number and the number of specific RBs. For example, if within 10M of system bandwidth, the starting RB number is 0 and the number of specific RBs is 5, RBs 0, 1, 2, 3 and 4 among 50 RBs of the system are specific RB resources, while other RBs 5, 6, . . . , 49 are non-specific RB resources, i.e., common RB resources.

As an embodiment of the present invention, the content of the specific time-frequency configuration information and constraint scheduling information acquired by the UE from the base station includes any one of the following three kinds of contents:

One physical cell ID or virtual cell ID of a most heavily interfering neighbor base station, and specific time-frequency resource configuration information and constraint scheduling information of the most heavily interfering neighbor base station;

More than one physical cell ID or virtual cell ID of a plurality of interfering neighbor base stations, specific time-frequency resource configuration information of the plurality of interfering neighbor base stations, and respective constraint scheduling information of the plurality of interfering neighbor base stations; and only specific time-frequency resource configuration information and constraint scheduling information, without any physical cell IDs or virtual cell IDs of interfering neighbor base stations.

S120: The terminal detects an interference signal of the neighbor cell according to the scheduling configuration information to acquire information about the interference signal.

In S120, the terminal with a NAICS receiver performs blind detection on the interference signal of the neighbor signal by using the scheduling configuration information of the neighbor cell, so as to acquire information about the interference signal.

As an embodiment of the present invention, the UE detects the information of the interference signal of the neighbor cell in any one of the following three ways:

if the content of the specific time-frequency configuration information and constraint scheduling information acquired by the UE from the base station includes one physical cell ID or virtual cell ID of a most heavily interfering neighbor base station, and specific time-frequency resource configuration information and constraint scheduling information of the most heavily interfering neighbor base station, then the UE detects information about the interference signals of the most heavily interfering neighbor base station only;

if the content of the specific time-frequency configuration information and constraint scheduling information acquired by the UE from the base station includes more than one physical cell ID or virtual cell ID of a plurality of interfering neighbor base stations, specific time-frequency resource configuration information of the plurality of interfering neighbor base stations, and respective constraint scheduling information of the plurality of interfering neighbor base stations, then the UE may selectively detect information about interference signals of one or more interfering neighbor base stations; and if the content of the specific time-frequency configuration information and constraint scheduling information acquired by the UE from the base station includes only specific time-frequency resource configuration information and constraint scheduling information without any physical cell IDs or virtual cell IDs of interfering neighbor base stations, the UE considers that the specific time-frequency resource configuration information and constraint scheduling information of all base stations are the same, and then selects one or more interfering neighbor base stations by itself to detect information about interference signals by using the specific time-frequency resource configuration information and constraint scheduling information of the serving base station.

S130: The terminal performs interference cancellation and/or interference suppression on the detected interference signal by using the information about the interference signal.

In S130, the UE with a NAICS receiver performs cancellation and/or suppression on the interference signal by using the detected information about the interference signal of the neighbor cell, so that the correctness of the user terminal in detecting a signal of a serving cell is improved. Subsequently, the UE needs to measure and report the CQI, RI and PMI information of the serving cell based on the received signal of interference cancelled and/or suppressed.

By the above solutions provided by the present invention, by reading configuration information of a serving base station, a terminal acquires scheduling configuration information of the interference signal of a neighbor cell on specific time-frequency resources; by the obtained scheduling configuration information of the neighbor cell, the terminal detects and identifies information about the interference signal of the neighbor cell, so as to effectively perform cancellation and/or suppression on the interference signal. By the above solutions provided by the present invention, the correctness of UE in detecting information about the interference signal of a neighbor base station can be improved, so that the interference signal is cancelled and/or suppressed, the detection accuracy of channel information and the demodulation correctness of useful signals are improved, and the data transmission throughput of cell edge UE is thus increased. Meanwhile, the method effectively avoids real-time information exchange between base stations, reduces the signaling overhead between the base stations and the signaling overhead to be sent to the UE by the base stations, and greatly reduces the UE implementation complexity. By the above solutions provided by the present invention, the UE with a NAICS receiver can be guided to perform blind detection on interference signals within a limited range; furthermore, the UE only needs to perform blind detection within the given time-frequency resources and scheduling associated parameter range, so that the UE implementation complexity is reduced greatly, and the UE power consumption is also reduced. Moreover, by the above solutions provided by the present invention, few changes are required to be done to an existing system, so that the compatibility of the system will not be influenced and the implementation is simple and efficient.

Corresponding to the method on the terminal side, an embodiment of the present invention further provides a method for processing interference signals on the network side, i.e., a network-assisted method for processing interference signals, including the following steps of:

configuring for a cell, by a base station, periodic scheduling configuration information on first specific time-frequency resources, sending the periodic scheduling configuration information on the first specific time-frequency resources to a neighbor base station, and receiving periodic scheduling configuration information on second specific time-frequency resources sent by the neighbor base station;

sending, by the base station, the periodic scheduling configuration information of the neighbor cell on the second specific time-frequency resources to a terminal; and sending, by the base station, on the first specific time-frequency resources, data to the terminal according to the scheduling configuration information.

Figure 6:
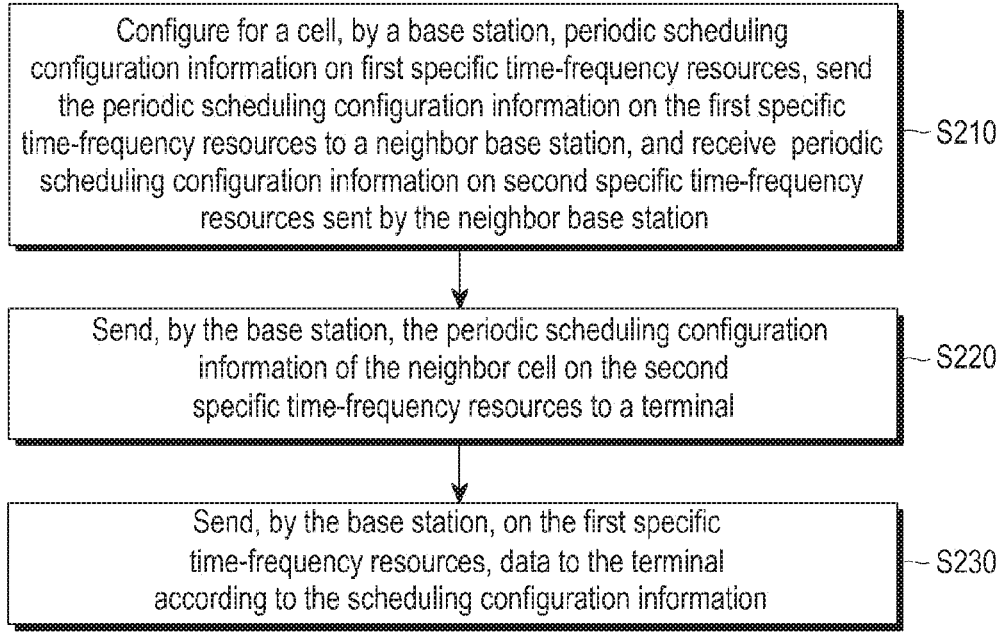
FIG. 6 is a flowchart of a method for assisting a terminal to process interference signals on the base station side according to an embodiment of the present invention.

As shown in FIG. 6, a flowchart of a method for assisting a terminal to process interference signals on the base station side according to an embodiment of the present invention is shown, including the following steps:

S210: A base station configures periodic scheduling configuration information on first specific time-frequency resources for a cell, sends the periodic scheduling configuration information on the first specific time-frequency resources to a neighbor base station, and receives periodic scheduling configuration information on second specific time-frequency resources sent by the neighbor base station.

In S210, the specific time-frequency resources refer to especially reserved subframes (SF) and a resource block (RB). On the specific time-frequency resources, the UE just needs to detect an interference signal of the neighbor cell within the given scheduling configuration information of the neighbor cell.

As an embodiment of the present invention, a configuration method of the specific time-frequency resources is: configuring same time-frequency resources for each base station.

As shown in FIG. 2, a schematic diagram of division of same specific time-frequency resources (subframes) used by base stations in a method for processing interference signals according to another embodiment of the present invention is shown. The following description is given with reference to FIG. 2.

Taking three cells as example, the three cells are configured with respective subframe sets S1_afs, S2_afs and S3_afs, and use the subframe sets S1_afs, S2_afs and S3_afs as their specific subframe resources. Here, the S1_afs, S2_afs and S3_afs are completely the same.

As an embodiment of the present invention, another configuration method of the specific time-frequency resources is: configuring different time-frequency subframe resources for each base station.

As shown in FIG. 3, a schematic diagram of division of different specific time-frequency resources (subframes) used by the base stations in a method for processing interference signals according to another embodiment of the present invention is shown. The following description is given with reference to FIG. 3.

Taking three cells as example, the three cells are configured with respective subframe sets S1_afs, S2_afs and S3_afs, and use the subframe sets S1_afs, S2_afs and S3_afs as their specific subframe resources. Here, the S1_afs, S2_afs and S3_afs are not completely the same.

As an embodiment of the present invention, another configuration method of the specific time-frequency resources is: configuring same frequency domain RB resources for each base station.

As shown in FIG. 4, a schematic diagram of division of same specific time-frequency resources (RBs) used by the base stations in a method for processing interference signals according to another embodiment of the present invention is shown. The following description is given with reference to FIG. 4.

Taking three cells as example, the three cells are configured with respective RB sets R1_afs, R2_afs and R3_afs, and use the RB sets R1_afs, R2_afs and R3_afs as their specific RB resources. Here, the R1_afs, R2_afs and R3_afs are completely the same.

As an embodiment of the present invention, another configuration method of the specific time-frequency resources is: configuring different frequency domain RB resources for each base station.

As shown in FIG. 5, a schematic diagram of division of different specific time-frequency resources (RBs) used by the base stations in a method for processing interference signals according to another embodiment of the present invention is shown. The following description is given with reference to FIG. 5.

Taking three cells as example, the three cells are configured with respective RB sets R1_afs, R2_afs and R3_afs, and use the RB sets R1_afs, R2_afs and R3_afs as their specific RB resources. Here, the R1_afs, R2_afs and R3_afs are not completely the same.

Therefore, in the technical solutions provided by the present invention, the second specific time-frequency resources of a plurality of neighbor cells are the same or different, and the first specific time-frequency resources are the same as or different from the second specific time-frequency resources.

In this step, the scheduling configuration information refers that a neighbor cell can perform constraint scheduling only on specific time-frequency resources. That is, a scheduler can only use the modulation scheme, transmission mode, rank indicator, precoding matrix indicator, UE-specific demodulation reference symbols and downlink transmission power and the like within a preset range on the specific time-frequency resources.

In this step, the modulation scheme constrained within a preset range by the constraint scheduling refers that a base station needs to perform scheduling on specific time-frequency resources in a lower-level modulation scheme, for example, QPSK and 16 QAM.

In this step, the transmission mode constrained within a preset range by the constraint scheduling refers that a base station needs to perform scheduling on specific time-frequency resources in one or more specific transmission modes already defined in the standards, for example, TM4 and TM3.

In this step, the rank indicator constrained within a preset range by the constraint scheduling refers that a base station needs to perform scheduling on specific time-frequency resources by using a lower rank, for example, RI=1.

In this step, the precoding matrix indicator constrained within a preset range by the constraint scheduling refers to a limited optional range for pre-coding, for example, PMI={1, 5, 9, 13} in a system having four transmitting antenna ports.

In this step, the special demodulation reference symbols constrained within a preset range by the constraint scheduling refer to a limited optional range for UE-specific modulation reference symbol sequences, for example, n_SCID is 0 or the port number is 7 in TM9.

In this step, the transmission power constrained within a preset range by the constraint scheduling refers that a base station needs to perform scheduling on specific time-frequency resources by using higher transmission power, for example, the parameter PA associated with the downlink transmission power is set as +3 dB.

As an embodiment of the present invention, a configuration method of the constraint scheduling information is: configuring same constraint scheduling information for each base station. The scheduling of each base station in a reserved subframe set meets the following conditions:

in a lower-level modulation scheme, the set of optional modulation methods is {QPSK,16 QAM};
the set of optional transmission modes is {TM4, TM3};
by using a lower rank, the set of optional RI is {RI=1};
by using pre-coding within a preset range, for example, in a system having four transmitting antenna ports, the set of optional PMI is {1, 5, 9, 13}; and
by using higher transmission power, the optional range of the parameter PA associated with the downlink transmission power is {2 dB,3 dB}.

As an embodiment of the present invention, another configuration method of the constraint scheduling information is: configuring different constraint scheduling information for each base station. Taking two base stations as example, the scheduling of the first base station in a reserved subframe set meets the following conditions:

in a lower-level modulation scheme, the set of optional modulation methods is {QPSK,16 QAM};
the set of optional transmission modes is {TM4, TM3};
by using a lower rank, the set of optional RI is {RI=1};
by using pre-coding within a preset range, for example, in a system having four transmitting antenna ports, the set of optional PMI is {1, 5, 9, 13}; and
by using higher transmission power, the optional range of the parameter PA associated with the downlink transmission power is {2 dB,3 dB}.

The scheduling of the second base station in a reserved subframe set meets the following conditions:

in a lower-level modulation scheme, the set of optional modulation methods is {QPSK};
the set of optional transmission modes is {TM4};
by using a lower rank, the set of optional RI is {RI=1};
by using pre-coding within a preset range, for example, in a system having four transmitting antenna ports, the set of optional PMI is { 1, 5, 9, 13}; and
by using higher transmission power, the optional range of the parameter PA associated with the downlink transmission power is {3 dB}.

As an embodiment of the present invention, one indication method of specific time-frequency resources is: indicating the reservation within a time cycle in a manner of bitmap. For example, 40 bits are used, corresponding to the configuration of each subframe within 40 ms cycle. If the corresponding bit is 1, it is indicated that the subframe is specific subframe resource; and if the corresponding bit is 0, it is indicated that the subframe is non-specific subframe resource, i.e., common subframe resource. For example, the bitmap can be referred the method for configuring an ABS subframe in the existing eICIC/FeICIC technology.

As an embodiment of the present invention, another indication method of specific time-frequency resources is: indicating the reservation within a time cycle by the starting subframe offset, the number of specific subframes and the cycle length. For example, if the cycle length is 40 ms, the starting subframe offset is 0 and the number of specific subframes is 3, it is indicated that subframes 0, 1 and 2 are specific subframe resources within every 40 ms cycle, and other subframes 3, 4, . . . , 39 are non-specific subframe resources, i.e., common subframe resources.

As an embodiment of the present invention, another indication method of specific time-frequency resources is: indicating the reservation of each RB within the system bandwidth in a manner of bitmap. For example, if 10M of system bandwidth employs 50 bits of information corresponding to configuration of 50 RBs, respectively, and if the corresponding bit is 1, it is indicated that the RB is specific RB resource; and if the corresponding bit is 0, it is indicated that the RB is non-specific RB resource, i.e., common RB resource.

As an embodiment of the present invention, another indication method of specific time-frequency resources is: indicating the reservation within the system bandwidth by the stating RB number and the number of specific RBs. For example, if within 10M of system bandwidth, the starting RB number is 0, and the number of specific RBs is 5, the RBs 0, 1, 2, 3 and 4 among 50 RBs of the system are specific RB resources, while other RBs 5, 6, . . . , 49 are non-specific RB resources, i.e., common RB resources.

Semi-static exchange of specific time-frequency resource configuration information and constraint scheduling information may be performed between base stations via X2 interfaces or S1 interfaces.

S220: The base station sends the periodic scheduling configuration information of the neighbor cell on the second specific time-frequency resources to a terminal.

In S220, by receiving the capability of processing interference signals reported by a terminal in advance, the base station may determine whether to configure corresponding specific time-frequency resource information and specific scheduling configuration information or not for the terminal, and then select and configure appropriate specific time-frequency resource information and specific scheduling configuration information for the terminal. For example, the terminal may report whether it supports interference detection in one or more transmission modes or not, such as, TM3 and TM4; for another example, the terminal may report whether it supports interference detection in one or more modulation schemes or not, such as, 64 QAM or 16 QAM; for further example, the terminal may report whether it supports interference detection with RI=2 or not, etc. The base station will select matched periodic scheduling configuration information of a neighbor cell on specific time-frequency resources according to the capability of the terminal for processing interference signals, so that the terminal processes interference signals better.

As an embodiment of the present invention, the sending, by the base station, the periodic scheduling configuration information of the neighbor cell on the specific time-frequency resources to a terminal includes: sending, by the base station, periodic scheduling configuration information of the neighbor cell on a part or all of the second specific time-frequency resources to a terminal.

Specifically, in S220, the base station may select a part or all of the specific time-frequency resources on a neighbor cell for the terminal according to the actual scheduling condition, and then inform the terminal. For example, a neighbor cell of a certain terminal configures subframes 0, 1 and 2 as specific time-frequency resources, so the serving base station may select one or more subframes from the subframes {0, 1, 2} as the specific time-frequency resources of the terminal and then inform the terminal.

In S220, a base station may send specific time-frequency resource configuration information and constraint scheduling information mainly to edge UEs under this base station, thereby improving the decoding performance. The base station determines edge UEs under this base station, then determines interfering neighbor base stations of each edge UE, and informs the edge UE with the specific time-frequency resource configuration information and constraint scheduling information of the interfering neighbor base stations.

In this step, the determination of cell edge UE and corresponding interfering base stations may be performed according to the reference signal received power (RSRP) or reference signal received quality (RSRQ) of a serving base station reported by UE. For example, if the RSRP/RSRQ difference between an interfering base station and the serving base station is less than a threshold, the UE is determined as cell edge UE, and the corresponding interfering base station is determined as an interfering base station.

Figure 7:
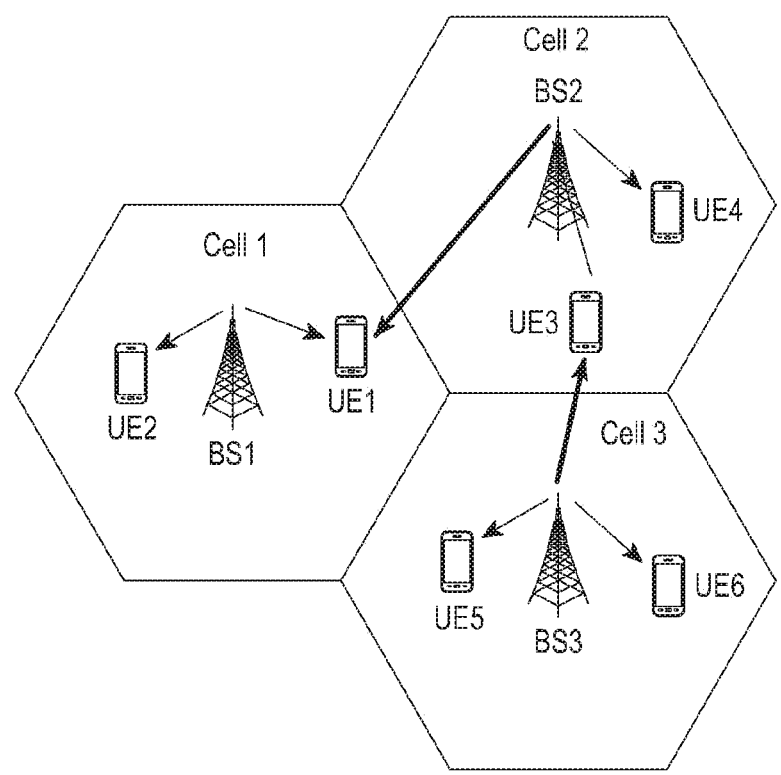
FIG. 7 is a distribution diagram of cells and users in a method for processing interference signals according to another embodiment of the present invention.

As shown in FIG. 7, it is assumed that UE1 and UE2 are located in cell 1, UE3 and UE4 are located in cell 2, and UE5 and UE6 are located in cell 3. By the above method, UE1 and UE3 may be determined as edge UE, UE2, UE4, UE5 and UE6 may be determined as non-edge UE, the interfering neighbor base station of the UE1 may be determined as BS2, and the interfering neighbor base station of the UE3 may be determined as BS3.

In this step, the base station may inform these edge UEs with the specific time-frequency resource configuration information and constraint scheduling information of interfering neighbor base stations of the UEs via broadcast signaling or a radio resource configuration (RRC) message, and also inform these edge UEs to use a NAICS receiver.

As an embodiment of the present invention, the base station may inform the UE with the content of the specific time-frequency configuration information and constraint scheduling information in any one of the following ways.

the base station informs the UE only with one physical cell ID or virtual cell ID of a most heavily interfering neighbor base station, and specific time-frequency resource configuration information and constraint scheduling information of the most heavily interfering neighbor base station;

the base station informs the UE with more than one physical cell ID or virtual cell ID of a plurality of interfering neighbor base stations, specific time-frequency resource configuration information of the plurality of interfering neighbor base stations, and respective constraint scheduling information of the plurality of interfering neighbor base stations; and the base station informs the UE only with specific time-frequency resource configuration information and constraint scheduling information without any physical cell IDs or virtual cell IDs of interfering neighbor base stations.

S230: The base station sends, on the first specific time-frequency resources, data to the terminal according to the scheduling configuration information.

In S230, a scheduler of the base station performs scheduling to edge UE under this base station and preferably performs scheduling on specific time-frequency resources of this edge UE's interfering neighbor base stations, and the scheduling information is information about MCS, RI, PMI and the like reported by the edge UE based on interference cancellation and/or suppression; however, the scheduling of the base station on its own specific time-frequency resources is merely constraint scheduling, that is, the scheduled MCS, RI, PMI and the like are selected only within a certain range.

Here, taking each base station being configured with different specific subframe resources as example, the constraint scheduling will be further described.

The distribution of base stations and UEs is as shown in FIG. 7, and the configuration of specific subframe resources is as shown in FIG. 3. BS1 preferably schedules UE1 on the specific time-frequency resources (the resources of the cell 1 corresponding to the S2_afs in FIG. 3) of BS2, while UE2 may be scheduled on all the resources; similarly, BS2 schedules UE3 on the specific time-frequency resources (the resources of the cell 2 corresponding to the S3_afs) of BS3, while UE4 may be scheduled on all the resources; and BS3 may schedule UE5 and UE6 on all the resources. Meanwhile, the BS1 scheduler can perform constraint scheduling only on the resources S1_afs, the BS2 scheduler can perform constraint scheduling only on the resources S2_afs, and the BS3 scheduler can perform constraint scheduling only on the resources S3_afs.

By the above solutions provided by the present invention, the correctness of UE in detecting information about the interference signal of a neighbor base station can be improved, so that the interference signal is cancelled and/or suppressed, the detection accuracy of channel information and the demodulation correctness of useful signals are improved, and the data transmission throughput of cell edge UE is thus increased. Meanwhile, the method effectively avoids real-time information exchange between base stations, reduces the signaling overhead between the base stations and the signaling overhead to be sent to the UE by the base stations, and greatly reduces the UE implementation complexity. Moreover, by the above solutions provided by the present invention, few changes are required to be done to an existing system, so that the compatibility of the system will not be influenced and the implementation is simple and efficient.

Figure 8:
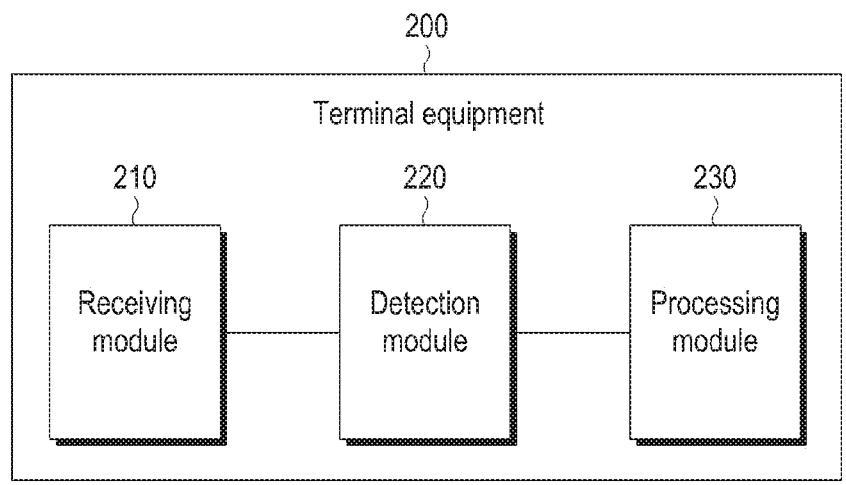
FIG. 8 is a structure diagram of terminal equipment according to an embodiment of the present invention.

Corresponding to the above method, an embodiment of the present invention provides terminal equipment for processing interference signals. As shown in FIG. 8, a structure diagram of terminal equipment according to an embodiment of the present invention is shown. The terminal equipment 200 includes a receiving module 210, a detection module 220 and a processing module 230.

The receiving module 210 is configured to receive configuration information sent by a base station to obtain periodic scheduling configuration information of a neighbor cell on specific time-frequency resources;

the detection module 220 is configured to detect an interference signal of the neighbor cell according to the scheduling configuration information and acquire information about the interference signal; and the processing module 230 is configured to perform interference cancellation and/or interference suppression on the detected interference by using the information about the interference signal.

As an embodiment of the present invention, the specific time-frequency resources acquired by the receiving module 210 include:

specific subframe resources and/or specific resource block resources.

As an embodiment of the present invention, the periodic scheduling configuration information acquired by the receiving module 210 is periodically repeated constraint scheduling information for constraining one or more of the following configuration information within a preset range:

modulation scheme, transmission mode, rank indicator, precoding matrix indicator, UE-specific demodulation reference symbols and downlink transmission power.

As an embodiment of the present invention, the receiving module 210 is configured to receive configuration information sent by a base station, includes:

the receiving module 210 is configured to receive broadcast signaling or a radio resource configuration (RRC) message sent by the base station, to read the configuration information.

As an embodiment of the present invention, the receiving module 210 is configured to periodically receive broadcast signaling or a radio resource configuration (RRC) message sent by the base station, to acquire scheduling configuration information of a neighbor cell on the specific time-frequency resources.

As an embodiment of the present invention, the receiving module 210 is configured to identify the specific time-frequency resources in any one of the following manners:

bitmap, starting subframe offset, or starting resource block number.

As an embodiment of the present invention, the terminal equipment further includes a sending module 240 (not shown in FIG. 8) configured to send its capability of processing interference signals to a base station so that the base station selects, for the terminal equipment 200, periodic scheduling configuration information of a neighbor cell on the specific time-frequency resources.

By the terminal equipment provided by the present invention, the correctness of UE in detecting information about the interference signal of a neighbor base station can be improved, so that the interference signal is cancelled and/or suppressed, the detection accuracy of channel information and the demodulation correctness of useful signals are improved, and the data transmission throughput of cell edge UE is thus increased. Meanwhile, by the terminal equipment provided by the present invention, the real-time information exchange between base stations is effectively avoided, the signaling overhead between the base stations and the signaling overhead to be sent to the UE by the base stations are reduced, and the UE implementation complexity is also greatly reduced. By the above solutions provided by the present invention, the UE with a NAICS receiver can be guided to perform blind detection on interference signals within a limited range; furthermore, the UE only needs to perform blind detection within the given time-frequency resources and scheduling associated parameter range, so that the UE implementation complexity is reduced greatly, and the UE power consumption is also reduced. Moreover, by the above solutions provided by the present invention, few changes are required to be done to an existing system, so that the compatibility of the system will not be influenced and the implementation is simple and efficient.

Figure 9:
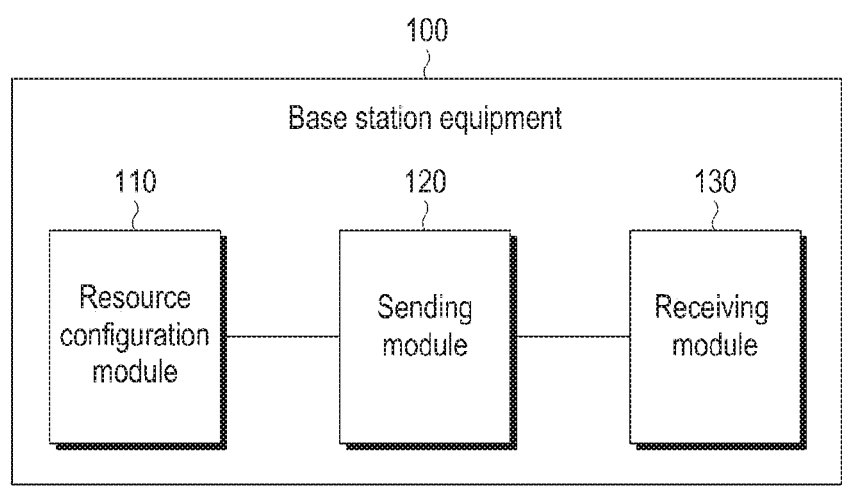
FIG. 9 is a structure diagram of base station equipment according to an embodiment of the present invention.

Corresponding to the above method, as shown in FIG. 9, a structure diagram of base station equipment according to an embodiment of the present invention is shown. The base station equipment 100 includes a resource configuration module 110, a sending module 120 and a receiving module 130.

Specifically, the resource configuration module 110 is configured to configure periodic scheduling configuration information on first specific time-frequency resources for a cell;

the receiving module 130 is configured to receive periodic scheduling configuration information on second specific time-frequency resources sent by the neighbor base station; and the sending module 120 is configured to send the periodic scheduling configuration information of the neighbor cell on the second specific time-frequency resources to a terminal, and send, on the first specific time-frequency resources, data to the terminal according to the scheduling configuration information.

As an embodiment of the present invention, the specific time-frequency resources include:

specific subframe resources and/or specific resource block resources.

As an embodiment of the present invention, the first specific time-frequency resources configured by the resource configuration module 110 are the same as or different from the second specific time-frequency resources.

As an embodiment of the present invention, the periodic scheduling configuration information configured by the resource configuration module 110 is periodically repeated constraint scheduling information for constraining one or more of the following configuration information within a preset range:

modulation scheme, transmission mode, rank indicator, precoding matrix indicator, UE-specific demodulation reference symbols and downlink transmission power.

As an embodiment of the present invention, the sending module 120 is configured to send the periodic scheduling configuration information of the neighbor cell on the second specific time-frequency resources to a terminal, includes:

the sending module 120 is configured to send the scheduling configuration information on the second specific time-frequency resources to the terminal via broadcast signaling or a radio resource configuration (RRC) message.

As an embodiment of the present invention, the resource configuration module 110 is configured to indicate the second specific time-frequency resources in any one of the following manners:

bitmap, starting subframe offset, or starting resource block number.

As an embodiment of the present invention, the receiving module 130 is further configured to receive the capability of processing interference signals sent by a terminal, and the resource configuration module 110 is configured to select, for the terminal, periodic scheduling configuration information of the neighbor cell on the second specific time-frequency resources according to the processing capability.

As an embodiment of the present invention, the sending module 120 is configured to send periodic scheduling configuration information of the neighbor cell on a part or all of the second specific time-frequency resources to the terminal.

By the base station equipment provided by the present invention, the correctness of UE in detecting information about the interference signal of a neighbor base station can be improved, so that the interference signal is cancelled and/or suppressed, the detection accuracy of channel information and the demodulation correctness of useful signals are improved, and the data transmission throughput of cell edge UE is thus increased. Meanwhile, by the base station equipment provided by the present invention, the real-time information exchange between base stations is effectively avoided, the signaling overhead between the base stations and the signaling overhead to be sent to the UE by the base stations are reduced, and the UE implementation complexity is also greatly reduced. Moreover, by the above solutions provided by the present invention, few changes are required to be done to an existing system, so that the compatibility of the system will not be influenced and the implementation is simple and efficient.

A person of ordinary skill in the art shall understand that all or a part of the steps of the methods in the foregoing embodiments may be implemented by related hardware instructed by a program. The program may be stored in a computer readable storage medium. When the program is executed, one or a combination of the steps of the methods in the embodiments is performed.

In addition, the functional units in each embodiment of the present invention may be integrated in a processing module, or may be independent physically from each other, or may be integrated into one module by two or more units. The integrated modules may be implemented in form of hardware or software functional modules. If the integrated modules are implemented in form of software functional modules and sold or used as independent products, the integrated modules may be stored in a computer readable storage medium.

The above-mentioned storage medium may be read-only memory, magnetic disc or optical disc, etc.

The above descriptions are merely parts of embodiments of the present invention. It should be pointed out that, a person skilled in the art may make various improvements and modifications without departing from the principle of the present invention, and these improvements and modifications shall be regarded as falling into the protection scope of the present invention.

The invention claimed is:

1. A terminal, comprising:
a transceiver configured to receive scheduling configuration information of at least two first neighbor base stations from a base station; and
a controller configured to control the transceiver:
in response to the scheduling information comprising identification information on a second neighbor base station transmitting a strongest interference signal among the at least two first neighbor base stations, to detect an interference signal of a second neighbor base station identified based on the scheduling information and perform interference cancellation on the detected interference signal of the second neighbor base station,
in response to the scheduling information comprising identification information on at least two third neighbor base stations among the at least two first neighbor base stations, to detect an interference signal of the at least two third neighbor base stations and to perform interference cancellation on the detected interference signals of the at least two third neighbor base stations, and
in response to the scheduling information not comprising identification information on the second neighbor base station or the identification information on the at least two third neighbor base stations and all of the at least two first neighbor base stations having the same scheduling information, to select at least one neighbor base station of the at least two first neighbor base stations and detect an interference signal of the selected at least one neighbor base station, and
to perform interference cancellation on the detected interference signal of the selected at least one neighbor base station.

2. The terminal of claim 1, wherein the scheduling information comprise information on at least one of subframe resources or resource block resources,
wherein the controller detects the interference signal of the selected at least one neighbor base station on the at least one of subframe resources or resource block resources.

3. The terminal of claim 1, wherein the scheduling information is periodically repeated constraint scheduling information for constraining at least one of modulation scheme, transmission mode, rank indicator, precoding matrix indicator, user equipment-specific (UE-specific) demodulation reference symbols and downlink transmission power within a preset range.

* * * * *